(12) United States Patent
Kim

(10) Patent No.: US 8,440,341 B2
(45) Date of Patent: May 14, 2013

(54) BATTERY PACK

(75) Inventor: Myungchul Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 409 days.

(21) Appl. No.: 12/795,209

(22) Filed: Jun. 7, 2010

(65) Prior Publication Data

US 2010/0323226 A1    Dec. 23, 2010

(30) Foreign Application Priority Data

Jun. 18, 2009    (KR) .................. 10-2009-0054296

(51) Int. Cl.
*H01M 2/10* (2006.01)
*H01M 6/46* (2006.01)
*H01M 2/02* (2006.01)

(52) U.S. Cl.
USPC ............. 429/100; 429/99; 429/153; 429/170

(58) Field of Classification Search .................... 429/99, 429/100, 152, 153, 163, 164, 170, 179; 174/260
See application file for complete search history.

(56) References Cited

U.S. PATENT DOCUMENTS

| | | | | |
|---|---|---|---|---|
| 6,146,788 | A | * | 11/2000 | Ikeda et al. .................... 429/160 |
| 2006/0032667 | A1 | * | 2/2006 | Sato .............................. 174/260 |
| 2008/0254350 | A1 | | 10/2008 | Moon |
| 2011/0262777 | A1 | * | 10/2011 | Choi et al. ........................ 429/7 |

FOREIGN PATENT DOCUMENTS

| | | |
|---|---|---|
| KR | 1020020014408 A | 2/2002 |
| KR | 1020080060536 A | 7/2008 |
| KR | 1020080092176 A | 10/2008 |

* cited by examiner

*Primary Examiner* — Milton I Cano
*Assistant Examiner* — Carlos Barcena
(74) *Attorney, Agent, or Firm* — Robert E. Bushnell, Esq.

(57) ABSTRACT

A battery pack that includes a holder to accommodate bare cells and a lead plate electrically connected to the holder. The lead plate includes female and male coupling members such that the holder is easily assembled with the lead plate and an error occurring when the holder and the lead plate are coupled with each other may be prevented. The lead plate may not separate from the holder after assembling the holder with the lead plate.

19 Claims, 5 Drawing Sheets

BATTERY PACK

CLAIM OF PRIORITY

This application claims priority to and the benefit of Korean Patent Application No. 10-2009-0054296, filed on Jun. 18, 2009, the entire content of which is incorporated herein by reference.

BACKGROUND OF THE INVENTION

1. Field of the Invention

An aspect of the present invention relates to a battery pack, and more particularly to, a battery pack accommodating a bare cell including secondary batteries.

2. Description of the Related Art

Demand for rechargeable secondary batteries is increasing recently due to development and manufacture of various kinds of portable electronic devices so that development of a high-capacity secondary battery is required to meet such demand. A battery case accommodating a plurality of unit cells is provided to satisfy this requirement.

The battery case includes a top case and a bottom case. A plurality of unit cells is connected to each other in parallel or serially through a plurality of lead plates. The plurality of unit cells is held in a holder accommodating the cells in a battery case to form a core pack. The core pack is accommodated in top and bottom cases electrically connected to a protective circuit module (PCM).

Generally, a plurality of unit cells and lead plates assembled with the holder are welded to the PCM. However, assembly of the lead plates with the holder is inferior. In other words, a structure that easily and correctly fixes the lead plates to the holder is not provided so that the productivity of the entire manufacturing process is deteriorated.

The above information disclosed in this Related Art section is only for enhancement of understanding of the background of the invention and therefore it may contain information that does not form the prior art that is already known to a person of ordinary skill in the art.

SUMMARY OF THE INVENTION

An aspect of the present invention provides a battery pack in which improved assembly between a lead plate electrically connected to a bare cell and a holder accommodating the bare cell is accomplished.

Another aspect of the present invention also provides a battery pack in which a lead plate and a holder are easily assembled.

Another aspect of the present invention further provides a battery pack in which an error occurring when a lead plate and a holder are assembled with each other is prevented.

Another aspect of the present invention further provides a battery pack in which a coupling force between a lead plate and a holder is enhanced after the lead plate and the holder are assembled.

In accordance with aspects of the present invention, a battery pack includes: a plurality of bare cells; at least one lead plate to connect the bare cells to each other in parallel or serially; a holder on which the bare cells are mounted; and a case accommodating the holder to which the bare cells and the lead plate are coupled, wherein a hook is formed in a male fixing member of the holder and a hole into which the hook is inserted is formed in a female fixing member of the lead plate.

The bare cells may be configured by which bare cell sets, in which bare cells are connected with each other in parallel, are connected with each other serially.

The lead plate may be made of an electrically conductive material such as copper, nickel, or aluminum.

The battery pack may further include a protective circuit module to which the lead plate is electrically connected. The protective circuit module includes a circuit board, a protective circuit element mounted on the circuit board, a connector to transmit current of the circuit board to the outside, and a pad electrically connected to the lead plate.

The holder includes a fixing member perpendicularly formed on a lateral side in which the hook is formed.

The hook includes a vertical portion and a horizontal portion perpendicularly bent from an end of the vertical portion.

The lead plate includes a connecting member having the hole.

The hole of the connecting member has a shape into which the hook is inserted and the hole has a rectangular shape.

The case includes a first case in which the holder is mounted, and a second case coupled to the top of the first case.

According to the present invention, assembly between the lead plate electrically connected to the bare cell accommodating the bare cell is enhanced.

The lead plate and the holder are easily assembled with each other.

An error occurring when the lead plate and the holder are assembled with each other may be prevented.

A coupling force between the lead plate and the holder may be increased after the lead plate and the holder are assembled.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
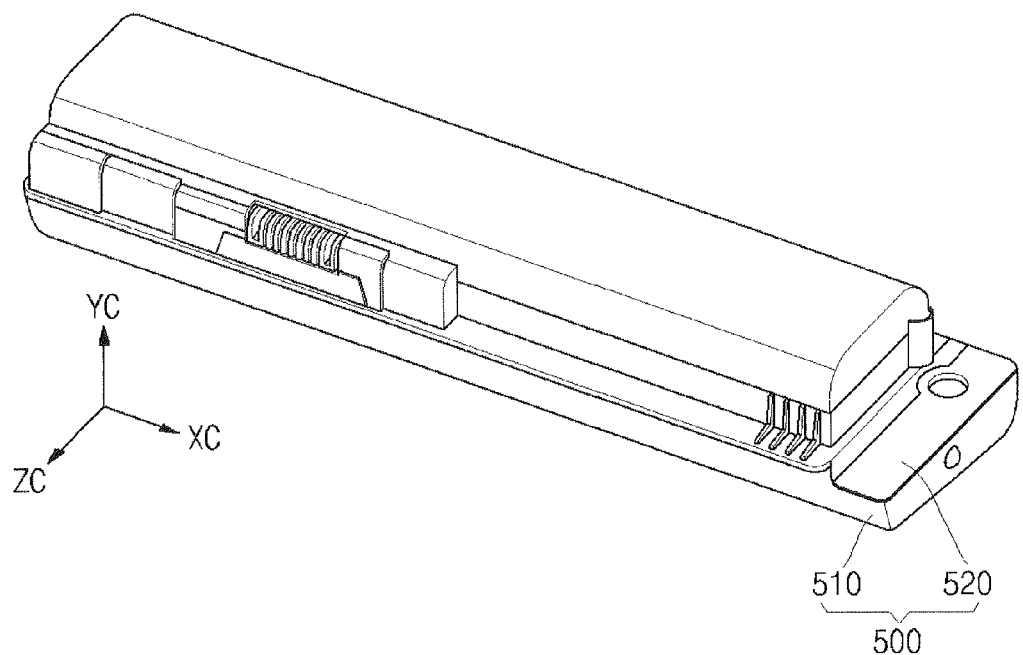
FIG. 1 is an external perspective view illustrating a battery pack according to an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Exemplary embodiments of the present invention will be described in detail with reference to the accompanying drawings.

A battery pack 100 according to an embodiment of the present invention includes a case 500 accommodating a plurality of bare cell sets 110, 120, and 130, first to fourth lead plates 210, 220, 230, and 240, a protective circuit module (hereinafter, referred to as a PCM) 300, and a holder 400. The case 500 includes a first case 510 and a second case 520.

Each of the bare cells includes an electrode assembly (not shown), a can accommodating the electrode assembly, and a cap assembly (not shown) coupled to an opening of the can.

The plurality of bare cells includes twelve bare cells. Since this is the number of unit cells to be described in this embodiment of the present invention, the number may be lower or higher than twelve. Each four bare cells of the twelve bare cells may form a single bare cell set. The four bare cells may be arranged and stacked in the form of two columns and two rows. By doing so, the twelve bare cells form three bare cell sets 110, 120, and 130. The bare cells in each set may be connected with each other in parallel. The three bare cell sets 110, 120, and 130 may be connected with each other serially. This structure may be referred to as a three series-four parallel connection. In this structure, bare cells in a set may not coupled with each other so that any one of the bare cells in a set may be replaced at any time.

Although a three series-four parallel connection is described in this embodiment of the present invention, the present invention is not limited to a bare cell structure having at least two bare cells.

Figure 2:
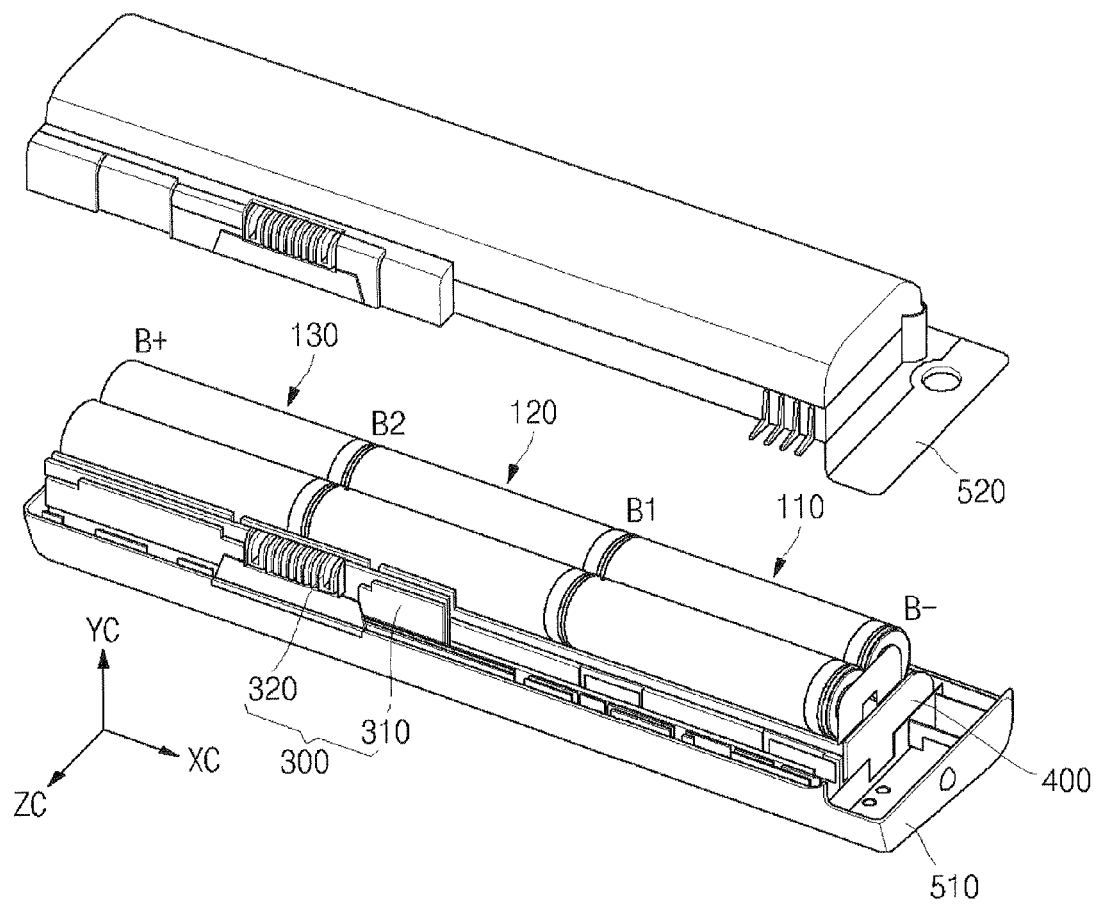
FIG. 2 is a perspective view illustrating a second case separated from the battery pack in FIG. 1.

Reference numerals B+ and B− in FIG. 2 indicate high current ends of a power source connected to both ends of the bare cells that may be connected serially and in parallel. B+ indicates the highest potential end as a positive power terminal, whereas B− indicates the lowest potential end as a negative power terminal. Therefore, a negative terminal of the first bare cell set 110 may be the lowest potential end B−, and a positive terminal of the third bare cell set 130 may be the highest potential end B+.

Among the first to fourth lead plates, the first lead plate 210 and the fourth lead plate 240 may connect each bare cell set in parallel through the negative terminal B− of the first bare cell set 110 and the positive terminal B+ of the third bare cell set 130. In this case, the first lead plate 210 and the fourth lead plate 240 may have a size and shape that connect terminals of each four bare cells forming a single bare cell set in parallel.

A parallel connection structure will be explained in detail. The first lead plate 210 may be welded and electrically connected to the negative terminal of the first bare cell set 110, and the fourth lead plate 240 may be welded and electrically connected to the positive terminal of the third bare cell set 130. The first lead plate 210 and the fourth lead plate 240 may be made of an electrically conductive metal such as copper, nickel, aluminum, and the like. The first lead plate 210 and the fourth lead plate 240 may be connected to a pad (not shown) of the PCM 300 for electric connection, directly or through a tab (not shown).

The second lead plate 220 may be positioned between the first bare cell set 110 and the second bare cell set 120 (B1), and the third plate 230 may be positioned between the second bare cell set 120 and the third bare cell set 130 (B2), respectively. The second lead plate 220 may be electrically connected to the positive terminal of the first bare cell set 110 and the negative terminal of the second bare cell set 120 by welding. The third lead plate 230 may be electrically connected to the positive terminal of the second bare cell set 120 and the negative terminal of the third bare cell set 130 by welding. The second lead plate 220 and the third lead plate 230 may be made of an electrically conductive metal such as copper, nickel, aluminum, and the like. The second lead plate 220 and the third lead plate 230 may be electrically connected to the pad (not shown) of the PCM 300, directly or through a tab (not shown).

The PCM 300 may include a circuit board 310, a protection circuit element (not shown), a connector 320, and the pad (not shown).

The circuit board 310 may be an approximately rectangular printed circuit board 310. The circuit board 310 may have conductive patterns (not shown) formed thereon, and may be electrically connected to the protection circuit element, the connector 320, and the pad (not shown).

The protection circuit element may be positioned on a surface of the circuit board 310 facing the outside of the battery pack 100, and monitors current, voltage, and temperature of the cells, and charge/discharge status of the bare cells to protect the battery pack 100.

The connector 320 may be positioned on a surface of the circuit board 310 facing the outside of the battery pack 100 to serve as an electric channel to an external electronic device. The pad (not shown) may be positioned on a surface of the circuit board 310 facing the bare cell, and may be electrically connected to the first to fourth lead plates 210 to 240, respectively.

The first to third bare cell sets 110, 120, and 130 are coupled to the holder 400. The first to fourth lead plates 210, 220, 230, and 240 may be electrically connected to the first to third bare cell sets 110, 120, and 130. Therefore, the holder 400 has a space formed therein to accommodate the first to third bare cell sets 110, 120, and 130. The first to third bare cell sets 110, 120, and 130 accommodated in the holder 400 may be connected to the first to fourth lead plates 210, 220, 230, and 240 such that one end of each of the first to fourth lead plates 210, 220, 230, and 240 may be withdrawn to the outside of the holder 400.

The holder 400 includes first to fourth fixing members 410, 420, 430, and 440 to fix the lead plates 210, 220, 230, and 240. The first to fourth fixing members 410, 420, 430, and 440 may be formed on a lateral surface of the holder 400. The fixing members 410, 420, 430, and 440 may be approximately perpendicular to the lateral surface of the holder 400.

The first to fourth lead plates 210, 220, 230, and 240 may be fixed to the first to fourth fixing members 410, 420, 430, and 440, respectively.

Since the fixing members 410, 420, 430, and 440 have the same length and shape, one of the fixing members will be described as an example. The fixing member 410 may be formed into an approximately rectangular plate, and has a hook 412 formed on a surface thereof. The hook 412 includes a vertical portion 414 and a horizontal portion 416 perpendicularly bent from the end of the vertical portion 414. The hook 412 may be integrally formed on the fixing member 410.

The first to fourth lead plates 210, 220, 230, and 240 may perpendicularly protrude from an outside surface of the holder 400. The first to fourth lead plates 210, 220, 230, and 240 include first to fourth connecting members 212, 222, 232, and 242 which may be formed on ends opposite to ends electrically connected to the bare cell sets 110, 120, and 130.

Since the first to fourth connecting members 212, 222, 232, and 242 have the same shape, only the first connecting member 212 will be explained as an example.

The connecting member 212 may have a hole 214 (female coupling member) formed in a central region into which the hook 412 (male coupling member) of the fixing member 410 is inserted. The hole 214 may have an approximately square shape such that the hook 412 may be inserted thereinto, but the present invention is not limited to this shape. Further, a protrusion 216 may be formed at the end of the connecting member 212. The protrusion 216 may be coupled to the circuit board 310 of the PCM 300.

The case 500 includes the first case 510 with a space where the holder 400 to which the bare cell sets may be coupled and may be mounted, and the second case 520 coupled to the top of the first case 510.

An assembly process of the battery pack according to an embodiment of the present invention will now be explained.

In an embodiment of the present invention, twelve bare cells may be provided to form the first to third bare cell sets 110, 120, and 130. Four unit bare cells may be connected in parallel to form a bare cell set. The first bare cell set 110, the second bare cell set 120, and the third bare cell set 130 may be connected to each other serially by which a positive terminal contacts a negative terminal of an adjacent bare cell set. The first to third bare cell sets 110, 120, and 130 may be connected to each other in parallel or serial may be connected to the first to fourth lead plates 210, 220, 230, and 240 to be electrically connected to an external device.

Figure 3:
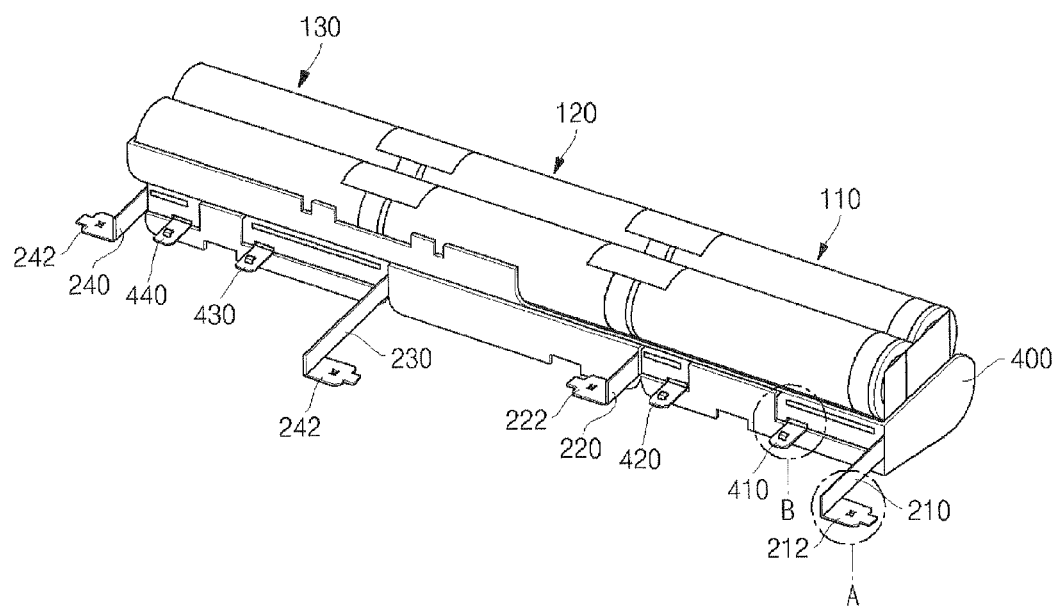
FIG. 3 is a perspective view illustrating an assembly of a bare cell set and a holder when the second case is separated from the battery pack in FIG. 1.
Figure 4:
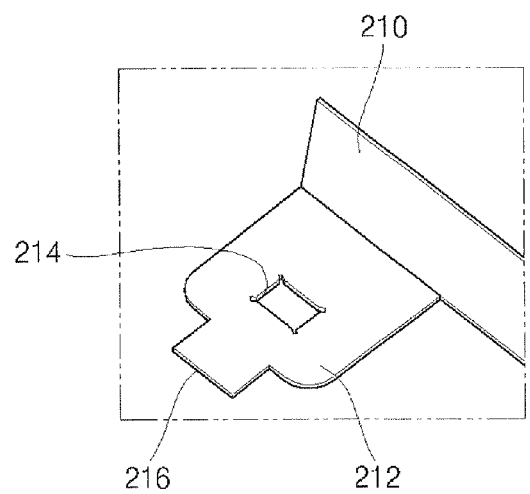
FIG. 4 is an enlarged view of a portion A of FIG. 3.
Figure 5:
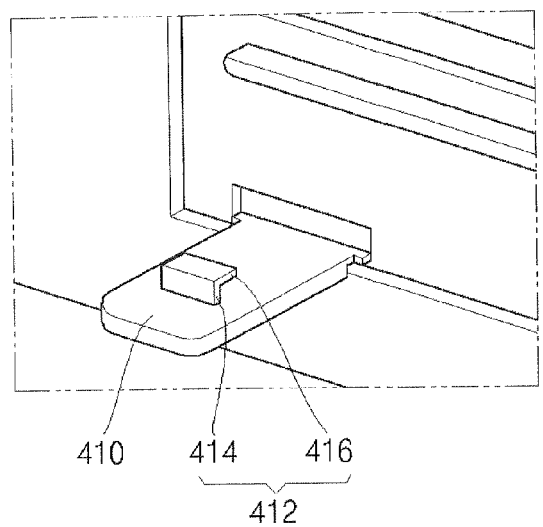
FIG. 5 is an enlarged view of a portion B of FIG. 3.

Referring to FIG. 3, these assembled bare cells may be mounted on the holder 400. The first to fourth lead plates 210, 220, 230, and 240 may be connected to the bare cells such that the first to fourth lead plates 210, 220, 230, and 240 protrude outside of the holder 400.

Figure 6:
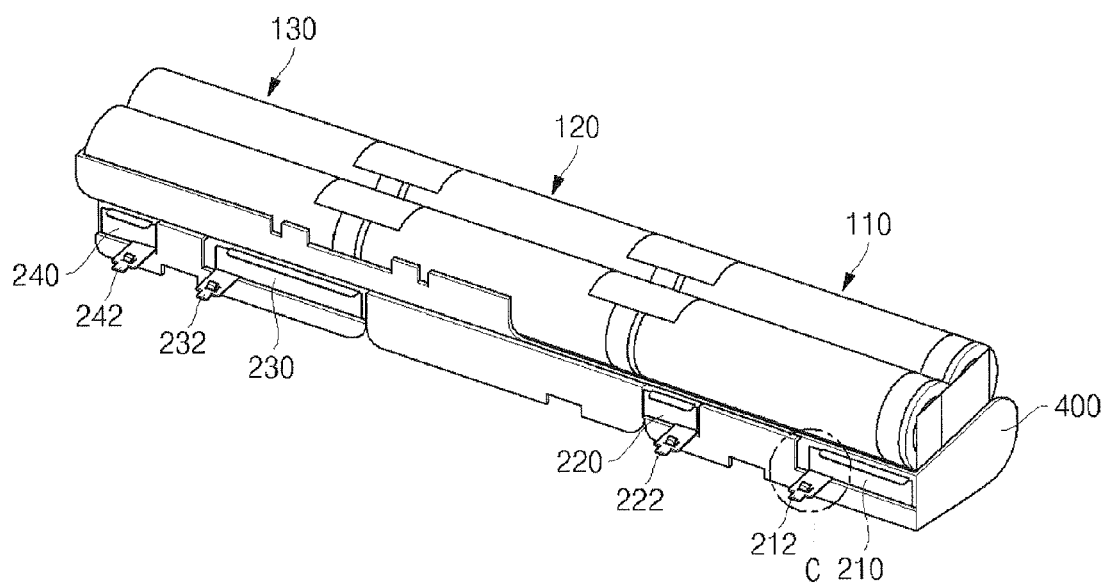
FIG. 6 is a perspective view illustrating that a fixing members of the holder are coupled with connecting members by bending lead plates.
Figure 7:
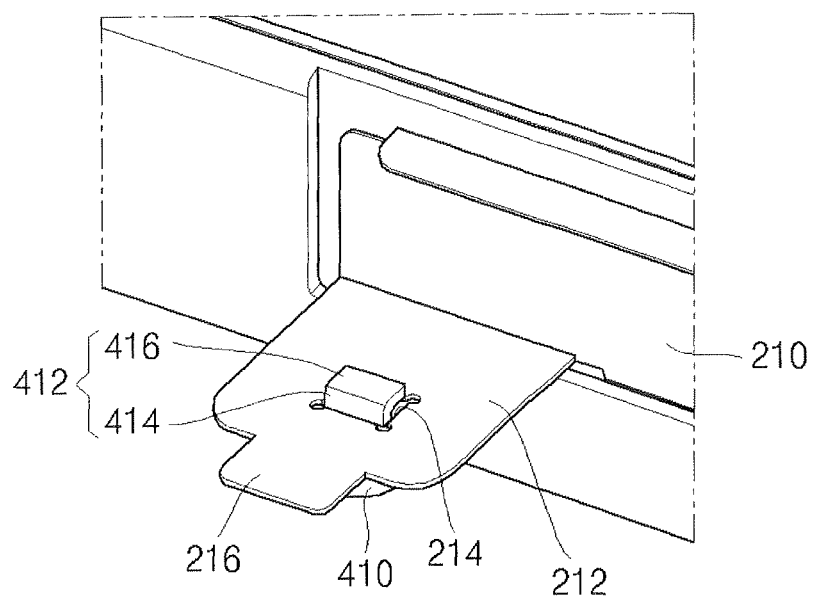
FIG. 7 is an enlarged view of a portion C of FIG. 6.

Referring to FIGS. 3 and 6, each of the connecting members 212, 222, 232, and 242 may be integrally formed on each end of the first to fourth lead plates 210, 220, 230, and 240 withdrawn from the holder 400. The first to fourth lead plates 210, 220, 230, and 240 may be bent toward the first to fourth fixing members 410, 420, 430, and 440 formed on lateral sides of the holder 400. When the first to fourth lead plates 210, 220, 230, and 240 are bent by approximately 90 degrees, the connecting members 212, 222, 232, and 242 of the lead plates 210, 220, 230, and 240 may be coupled to the fixing members 410, 420, 430, and 440 formed on the lateral sides of the holder 400. At this time, the hook 412 of the fixing member 410 may be inserted into the hole 214 of the connecting member 212. The size of the hole 214 may be larger than that of the horizontal portion of the hook 412 such that the hook 412 easily passes through the hole 214. Referring to FIG. 7, the hook 412 inserted into the hole 214 protrudes as high as a length of the vertical portion 414. Thus, the hook 412 of the fixing member 410 inserted into the hole 214 of the connecting member 212 may not separate from the connecting member 212, and may be kept in being fixed to the connecting member 212.

The four lead plates 210, 220, 230, and 240 may be bent by approximately 90 degrees and may be fixed to the lateral side of the holder 400. Thus, the battery pack 100 may be easily assembled. Further, the lead plates 210, 220, 230, and 240 may be coupled to the holder 400 at the position where the connecting members 212, 222, 232, and 242 of the lead plates 210, 220, 230, and 240 correspond to the fixing members 410, 420, 430, and 440 of the holder 400. By doing so, an assembly error does not occur, and the lead plates 210, 220, 230, and 240 are prevented from being easily separated from the holder 400 when the lead plates 210, 220, 230, and 240 are coupled to the holder 400. Therefore, the lead plates 210, 220, 230, and 240 are not easily separated from the holder 400 by external shock after the coupling.

After the coupling between the holder 400 and the lead plates 210, 220, 230, and 240, the lead plates 210, 220, 230, and 240 may be welded to the PCM 300. After that, the second case 520 may be coupled to the top of the first case 510 to finish the assembly of the battery pack 100.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery pack comprising;
   a plurality of bare cells;
   at least one lead plate to connect the bare cells to each other in parallel or serially;
   a holder on which the bare cells are mounted; and
   a case accommodating the holder to which the bare cells and the lead plate are coupled,
   wherein the holder comprises a male coupling member,
   wherein the lead plate comprises a female coupling member coupled to the male coupling member, and
   wherein the female coupling member is a hole formed in a connecting member of the lead plate.

2. The battery pack of claim 1, wherein the male coupling member is a hook formed in a fixing member of the holder, said hook of the fixing member is inserted into the hole of the connecting member.

3. The battery pack of claim 2, wherein the holder comprises the fixing member perpendicularly formed on a lateral side in which the hook is formed.

4. The battery pack of claim 3, wherein the hook comprises a vertical portion and a horizontal portion perpendicularly bent from an end of the vertical portion.

5. The battery pack of claim 1, wherein the bare cells are configured by which bare cell sets, in which bare cells are connected with each other in parallel, are connected with each other serially.

6. The battery pack of claim 1, wherein the lead plate is made of an electrically conductive material such as copper, nickel, or aluminum.

7. The battery pack of claim 1, further comprising a protective circuit module to which the lead plate is electrically connected.

8. The battery pack of claim 1, wherein the protective circuit module comprises:
   a circuit board;
   a protective circuit element mounted on the circuit board; and a connector to transmit current of the circuit board to the outside, wherein the protective circuit module is electrically connected to at least one of the plurality of lead plates.

9. The battery pack of claim 1, wherein the hole of the connecting member has a shape into which the male coupling member is inserted.

10. The battery pack of claim 9, wherein the hole has a rectangular shape.

11. The battery pack of claim 1, wherein the case comprises:

a first case in which the holder is mounted; and a second case coupled to the top of the first case.

12. A battery pack, comprising;

a plurality of bare cells;

at least one lead plate to connect the bare cells to each other in parallel or serially;

a holder on which the bare cells are mounted, the holder, comprising:

a plurality of lead plates;

a plurality of connecting members having a hole, each connecting member of the plurality of connecting members extending from each lead plate of the plurality of lead plates; and a plurality of fixing members having a hook, the plurality of fixing members coupled to the plurality of connecting members, respectively, wherein the hook of the plurality of fixing members are inserted into the hole of the plurality of connecting members, respectively.

13. The battery pack of claim 12, wherein the bare cells are configured in bare cell sets, in which bare cells are connected with each other either in parallel or serially.

14. The battery pack of claim 12, wherein the lead plate is made of an electrically conductive material such as copper, nickel, or aluminum.

15. The battery pack of claim 12, further comprising:

a protective circuit module electrically connected to at least one of the lead plates of the plurality of lead plates.

16. The battery pack of claim 12, wherein the protective circuit module, comprises:

a circuit board;

a protective circuit element mounted on the circuit board;

a connector to transmit current of the circuit board to the outside, wherein the protective circuit module is electrically connected to at least one of the plurality of lead plates.

17. The battery pack of claim 12, wherein each hook of the plurality of hooks comprises a vertical portion and a horizontal portion perpendicularly bent from an end of the vertical portion.

18. The battery pack of claim 12, wherein each hole of the plurality of holes has a rectangular shape.

19. The battery pack of claim 12, wherein the case comprises:

a first case in which the holder is mounted; and a second case coupled to the top of the first case.

* * * * *